March 30, 1965     H. L. PETERS     3,176,205
COMPARATOR MECHANISM
Filed Oct. 2, 1961     2 Sheets-Sheet 1
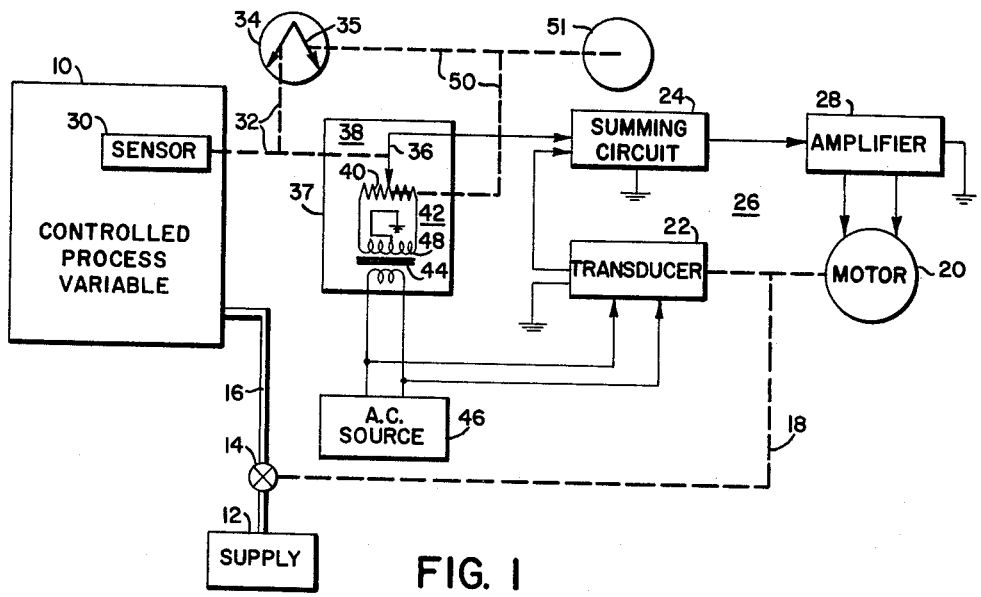
FIG. 1
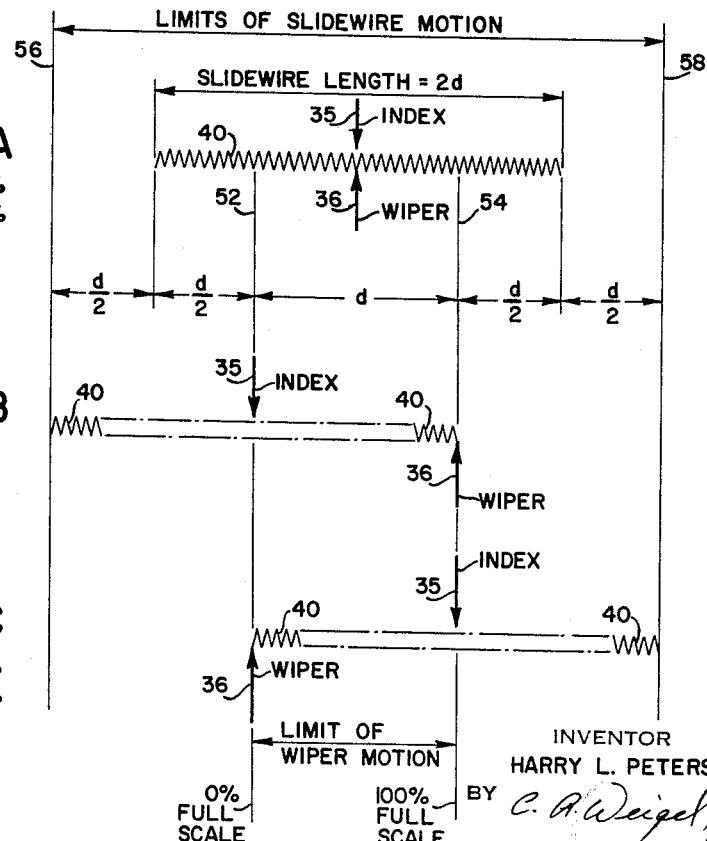
INVENTOR
HARRY L. PETERS
BY C. A. Weigel Jr.
ATTORNEY

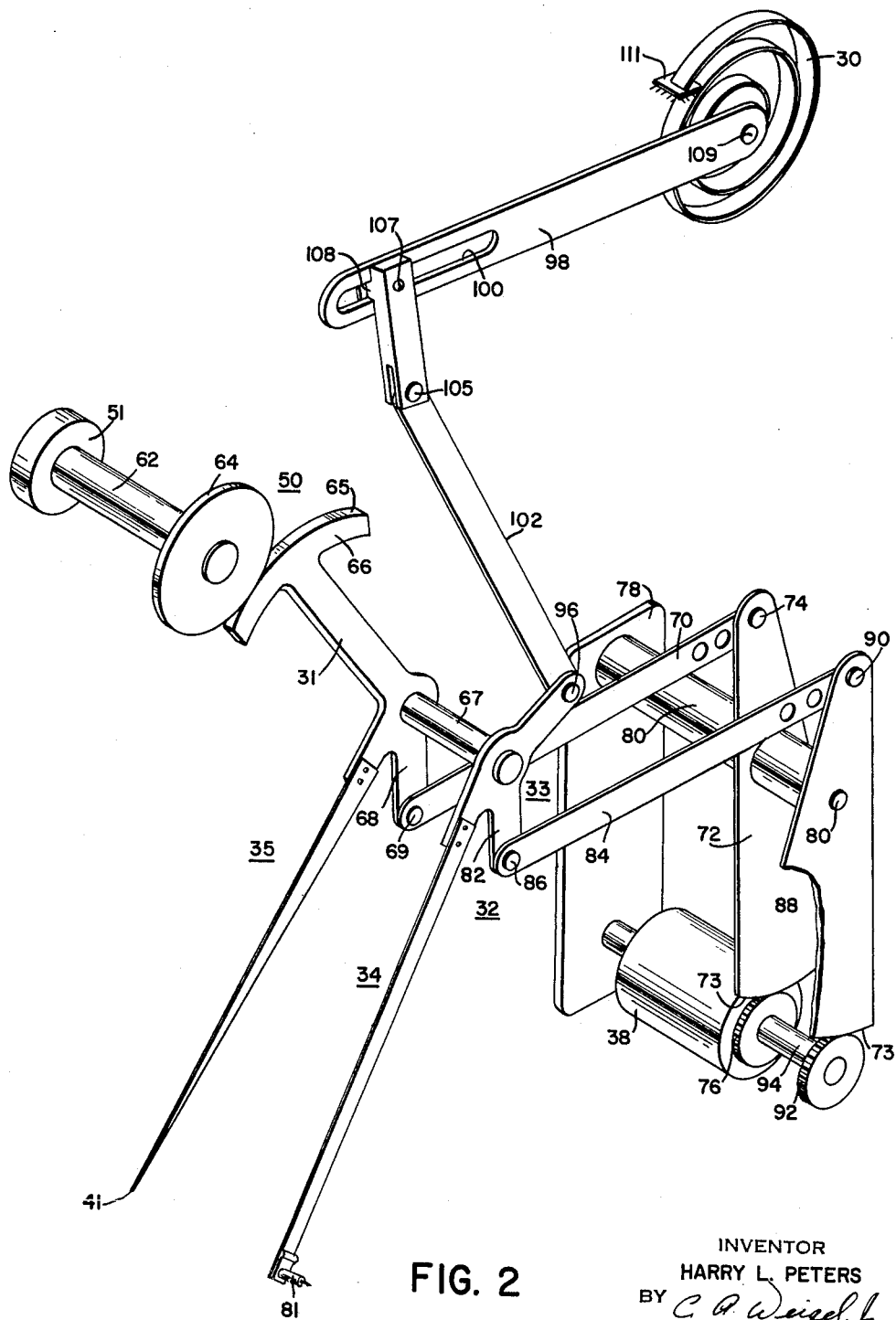

United States Patent Office 3,176,205
Patented Mar. 30, 1965

3,176,205
COMPARATOR MECHANISM
Harry L. Peters, Clarks Summit, Pa., assignor to Weston Instruments, Inc., a corporation of Texas
Filed Oct. 2, 1961, Ser. No. 142,079
5 Claims. (Cl. 318—28)

This invention relates to a comparator mechanism and, more particularly, to a relatively simple device capable of determining the deviation in amplitude between two mechanical signals.

In the field of automatic control it is often necessary or desirable to control a process such that the process variable maintains a desired performance level. By "process" is meant the collective functions performed in, and by, the equipment in which a variable is to be controlled, i.e., the process variable, which varies as a function of time. The process variable may be the temperature of a furnace, the path of flight of an airplane, or the pressure in a tank, to name a few. A standard, industrial type recorder, or indicator, may show the actual performance level, or value, of a process variable, and a set point index on the recorder scale may indicate the relation of the process variable to its reference or desired performance level, but the recorder, taken by itself, cannot control the process variable. To automatically control the process variable, it is necessary to continuously detect the instantaneous deviation between the actual and desired values of the process variable. A controller may then act upon this deviation information to return the process variable to its desired value.

One such prior art device, for comparing the actual and the desired performance levels of a process variable, made use of two identical potentiometers, the frames of which were mechanically fixed. The wiper of one potentiometer was positioned by a mechanical input signal having an amplitude corresponding to the actual performance level, or value, of the process variable. The wiper of the other potentiometer was positioned in accordance with the desired performance level, or set point. By connecting the slidewires of the two potentiometers in parallel across an energy source to form a bridge circuit, an electrical error signal, representative of the deviation between actual and desired performance, is available from across the two wipers. The difficulty with this arrangement is that two potentiometers are required, and both must have substantially identical electrical characteristics. If their electrical characteristics are not identical, an output deviation signal will result even though the two wipers are in the same relative positions. These factors tend to increase the cost of the comparator device, especially if low torque potentiometers are required to accommodate low power input signals.

Other prior art comparator devices have made use of a single potentiometer whose wiper is positioned by a mechanical signal having an amplitude corresponding to the actual performance level, or value, of the process variable. In these devices, the wiper is allowed to be positioned over the entire length of the slidewire. The slidewire itself is positioned with respect to the wiper in accordance with the desired performance level, or set point. To prevent the wiper from coming off the end of the slidewire as the actual and desired performance levels of the process diverge, a mechanical disengagement between the input signal and wiper is employed. The slidewire, when included in a half bridge circuit produces an electrical error signal that is representative of the deviation between the actual and desired performance. This scheme has the apparent disadvantage of requiring a mechanical disengagement which is generally relatively expensive. Also, because of the use of the mechanical disengagement, the error signal is not proportional to the divergence between the actual and desired performance levels except over a limited range.

It is, therefore, an object of this invention to obviate many of the disadvantages of prior art comparator devices.

Another object of this invention is to permit the efficient use of a potentiometer to detect the deviation between the actual and desired values of the process variable in a process control system.

In accordance with one embodiment of the invention, a mechanical device is constructed to compare the relative amplitudes of first and second mechanical signals. The first mechanical signal may correspond in amplitude to the desired value of a process variable, and the second mechanical signal to the actual value of the process variable. The device includes an impedance element, such as the slidewire of a potentiometer having a variable tap, or wiper. The slidewire itself is mechanically positioned with respect to its wiper by the first signal and the wiper is mechanically positioned with respect to the slidewire by the second signal.

The driving linkages associated with the slidewire and wiper permit substantially identical relative movements of the slidewire and wiper for the same amplitude input signals. By limiting the range of motion of the wiper to one half of the length of the slidewire, the impedance between the wiper and one end of the slidewire is always proportional to the difference in amplitude between the two input signals. The mechanical device of this invention is relatively simple and capable of use with mechanical sensors having low power output signals without introducing significant errors in recording or indicating the amplitude of such signals.

Further advantages and features of this invention will become apparent upon consideration of the following description read in conjunction with the drawing wherein;

FIGURE 1 is a part block and part schematic diagram of an electrical controller utilizing the device of this invention;

FIGURE 2 is a pictorial view of one form of the device of this invention that may be used in the controller of FIG. 1; and FIGURE 3a through 3c, inclusive, each are schematic representations of the slidewire potentiometer illustrated in FIG. 2 depicting the relative positions of the slidewire and its wiper for different amplitude input signals.

The invention perhaps may be more easily described and understood when it is considered in its application to a conventional electric controller. Thus in the drawing of FIG. 1, there is illustrated a block 10 which represents part of a process whose performance is to be controlled. The block 10 may be, for example, the air supply tank for an air hammer. In this instance, the process variable pressure is to be maintained at some constant level. Alternatively, the process variable may be the temperature of a furnace, the speed of a shaft, etc. The tank 10 is depicted as receiving air from an air supply 12 through a control valve 14 and a supply line 16. The valve 14 is controlled by the output of a conventional feedback servo system 26. Specifically, the valve 14 is mechanically coupled by a suitable linkage 18 to be adjusted by a servo proportioning motor 20. The motor 20 may be of a conventional type having forward and reverse windings (not shown) which are selectively energized by a suitable servo amplifier 28.

The drawing of FIG. 1 also illustrates a mechanical pressure sensor 30 in the tank 10 which may be a conventional Bourdon tube. The sensor 30 provides a first mechanical output signal in the form of a rotary motion (the details of which are described hereinafter in conjunction with FIG. 2) which is mechanically coupled by a linkage 32 to the comparator 37 of this invention. An indicator pen (or pointer) 34 is also mechanically coupled by the linkage 32 to be actuated by the sensor 30 and hence visually indicates the actual value of the pressure in the tank 10. The indicator pen 34, if desired, may record the actual pressures on a chart paper.

The comparator 37 includes an electrical voltage divider (or impedance) element 40 illustrated as the slidewire 40 of a potentiometer 38. The slidewire 40 has a variable tap or wiper 36 which is mechanically coupled by the linkage 32 to be positioned or moved relative to the slidewire 40 over a lineal distance proportional to the amplitude of the first output signal, i.e., pressure in the tank 10. The slidewire 40 is connected to form part of a half-bridge 42 which includes a transformer 44 whose primary winding is driven by an alternating current (A.C.) signal from an A.C. voltage source 46 and whose secondary winding 48 is center-tapped and the center tap grounded.

The slidewire 40 is mechanically coupled by a linkage 50 (the details of which are described hereinafter in the description of FIG. 2) to be moved, or positioned, with respect to the wiper 36 by a second mechanical signal derived from an adjustable set point index knob 51. The second mechanical input signal also is mechanically coupled by linkage 50 to a set point index, or pointer 35, which visually indicates the desired performance level of the process, i.e., pressure of the tank 10. The electrical output from the comparator 37, derived from between the wiper 36 and ground, is connected to the input of a summing circuit 24.

It may be noted that with the transformer 44 center-tapped, the bridge 42 is balanced when the wiper 36 is at the electrical center of the slidewire 40. If the slidewire resistance is a linear function of its length, the electrical center corresponds closely to the mechanical center. The point of bridge balance represents the control or set point of the controller of FIG. 1. If the wiper 36 or slidewire 40 are moved relative to each other, such that the wiper 36 is no longer at the electrical center of the slidewire 40, the resistances between the wiper 36 and either end of the slidewire 40 are no longer equal in value, but vary in value proportionately to the magnitude of the difference between the set point and actual values of the process variable. The resulting bridge output signal is thus an error signal having a phase and amplitude corresponding to the direction and magnitude of deviation of the actual value of the process variable from its set point, or desired value.

To complete the servo system 26, the linkage 18 from the motor 20 is also coupled to an electromechanical transducer 22 which converts the mechanical motion, that is, signal, from the motor 20 to an electrical signal. The A.C. source 46 also is connected to the transducer 22. The transducer 22 may be a conventional Wheatstone bridge (not shown) with the A.C. voltage from the source 46 coupled across the bridge input. One of the arms of the bridge may include a potentiometer whose wiper is positioned by the motor 20 acting through the linkage 18. The output electrical signal from the bridge (the transducer 22) represents the actual response of the servo system 26 and is connected to the summing circuit 24 in the servo system 26.

The summing circuit 24 may be a conventional resistive adder which algebraically adds the electrical signals from the comparator 37 and the transducer 22. The summing circuit output signal is coupled to the servo amplifier 28 to complete the feedback servo system 26.

In its conventional operation, the servo system 26, acting through the motor 20 and linkage 18, positions the valve 14 to vary the air pressure in the tank 10 until it corresponds to the desired air pressure as determined by the set point index knob 51. This movement of the linkage 18 is converted by the transducer 22 to a negative feedback electrical A.C. signal having a phase and amplitude corresponding to the movement of the linkage 18. This negative feedback signal then is subtracted from the comparator 37 error signal which is, as previously described, an A.C. signal having a phase and amplitude determined by the relation between the actual pressure in the tank 10 and the desired pressure. The negative feedback signal improves the stability of the servo system 26, but may be omitted if desired.

If it is assumed, for example, that the pressure in the tank 10 increases above the desired value, this increase in pressure is sensed by the sensor 30 to produce a first mechanical output signal on the linkage 32. This first mechanical output signal moves the wiper 36, relative to the slidewire 40 in the comparator 37. As the wiper 36 moves, the initially balanced bridge 42 becomes unbalanced and produces an A.C. error signal having a phase and amplitude determined by the magnitude and direction of bridge unbalance. The A.C. error signal passes through the summing circuit 24, is amplified by the amplifier 28, and energizes the motor 20 to reposition the valve 14 such as to decrease the amount of air supplied to the tank 10.

As it is conventional, the operation of the feedback servo system 26 will not be described further other than to state that it varies the air pressure in tank 10 until it reaches the desired value as determined by the adjustment of set point knob 51 at which time the input error signal from comparator 37 is reduced to zero.

In accordance with the invention the linkages 32 and 50 are constructed in a novel manner, as illustrated in FIG. 2, to facilitate the use of relatively low-torque potentiometers for comparing relatively low power input signals. The novel mechanism of FIG. 2 permits the potentiometer slidewire 40 and its wiper 36 to have substantially identical ranges of travel for equal mechanical input signals. Further, the mechanism of FIG. 2 is such as to limit the range of travel of both the slidewire 40 and the wiper 36 to one-half of the total lineal length of the slidewire 40.

In FIG. 2 the set point index 35, which comprises a base member 31 and an index arm 41, is formed from two pieces of sheet stock and is illustrated as being in the general shape of a T. The portion of the base member 31 which forms the upright member of the T is illustrated as riveted to the index arm 41 that is tapered to a point at one end. The base member 31 is pivotally mounted on a pointer mounting shaft 67 by a suitable bearing (not shown). The left hand end of the horizontal bar portion of the T-shaped index 35 is in the form of an arcuate sector 66. The set point knob 51 is fixedly mounted on one end of a shaft 62. A friction wheel 64 is mounted on the other end of the shaft 62 and is positioned to engage a friction surface 65 on the sector 66. In this manner rotation of the knob 51 causes the index 35 to pivot about the mounting shaft 67. Alternatively, the index arm 41 may be adjustably mounted to the base member 31 as illustrated on pages 8–13 of Process Instruments and Controls Handbook, by Considine (1957).

The other end of the horizontal bar portion of the T-shaped index 35 is connected to one end of an index linkage 70 by a suitable pivot 69. The other end of the index linkage 70 is pivoted on a stud 74 which is mounted on the driving end of a potentiometer drive sector gear 72. The sector gear 72 is pivotally mounted by a suitable bearing on a sector gear shaft 80 which is mounted on a support member 78. The potentiometer 38, illustrated as a conventional cylindrically shaped, low-torque potentiometer, is rotatably mounted by suitable means on the support member 78 so as to be free to rotate about its longitudinal axis. A potentiometer drive gear 76 is mounted on the front portion of the potentiometer 38 in such a manner as to engage the gear teeth 73 of the sector gear 72. In this manner rotation of the knob 51, acting through the mechanical linkage 50 which includes the shaft 62, the friction wheel 64, the friction sector 66, the potentiometer drive arm 68, the index linkage 70, the stud 74, and sector gear 72, rotates the frame of the potentiometer 38 and hence its slidewire 40 (FIG. 1) with respect to its wiper 36 (FIG. 1).

The indicator pen 34 is formed from two pieces of sheet stock in the general shape of a Y to have a base member 33 and a pen arm 81. The center portion of the base member 33 is pivotally mounted on the mounting shaft 67 by a suitable bearing (not shown). The upper right-hand portion of the base member 33 of the Y-shaped indicator pen 34 is illustrated as being riveted to the pen arm 81. An ink pen may be mounted on the pen arm 81 to make an ink mark on circular chart paper. The leg of the base member 33 of the Y-shaped indicator pen 34 has at its extreme end, pivotally mounted by pivot 96 to one end of a first sensor, linkage 102 which may be formed from a piece of sheet stock. A second sensor linkage 98 is formed from a piece of sheet stock as an elongated member having an elongated slot 100 at one end. The end 109 of the second sensor linkage 98 that is opposite the slotted end is fixedly mounted to be rotated by the sensor 30 which is depicted as a Bourdon tube having one end 111 fixed. A locking member 108 is designed to slide in the slot 100 and to be locked to the sensor linkage 98 by adjustment of a locking screw 107. The free end of the locking member 108 is pivotally mounted to the first sensor linkage 102 to pivot as the second sensor linkage 98 is rotated by the sensor 30.

The left-hand portion of the base member 33 of the Y-shaped indicator pen 34 is pivotally mounted at its extreme end to one end of a wiper linkage 84 by a suitable pivot 86. The other end of the wiper linkage 84 (which may be formed from a piece of sheet stock) is pivotally mounted by a suitable bearing on a stud 90. The stud 90 is fixedly mounted on the driving end of a wiper drive sector gear 88. The wiper sector gear 88 is pivotally mounted at its center on the sector gear shaft 80 by a suitable bearing. The potentiometer 38 has a wiper drive shaft 94 which passes through a bearing in the front portion of the potentiometer 38 and the potentiometer drive gear 76 to allow the potentiometer 36 (FIG. 1) to be positioned. A wiper drive gear 92 is fixedly mounted on the front end of the wiper drive shaft 94 such as to engage gear teeth 73 in the wiper sector gear 88.

As thus described, the sensor 30 acts through the wiper linkage 32 which includes the first and second sensor linkages 98 and 102, the indicator pen arm 82, the wiper linkage 84, the wiper sector gear 76, and the wiper drive gear 92, to position the wiper 36 (FIG. 1) with respect to the slidewire 40 (FIG. 1) in accordance with the pressure variations sensed by the sensor 30.

The potentiometer and wiper drive arms 68 and 82, respectively, are formed to have the same length, as are the index and wiper linkages 70 and 84, respectively. The potentiometer and wiper sector gears 72 and 88 are identical in size and shape and have the same number of gear teeth as the potentiometer and wiper drive gears 76 and 92, respectively. By so forming these elements of the mechanical linkages 32 and 50 that lie between the index 35 and the indicator pen 34, like movements of the index 35 or the indicator pen 34 produce like proportional movements of the wiper 36 and slidewire 40 (FIG. 1). The number of gear teeth 73 in each of the potentiometer wiper sector gears 72 and 88 is selected such that maximum rotation from one end of the sector to the other limits the lineal movements of the wiper 36 (FIG. 1) and the slidewire 40 (FIG. 1) to one-half of the total lineal length of the slidewire. The position of the first sensor linkage 98 in slot 100 may be varied to position the index 35 and indicator pen 34 such that both are zero adjusted and have the same range of movement for like input signals. Alternatively, of course, the index and pen arms 41 and 81, respectively, may be individually adjusted if they are adjustably mounted as described by Considine.

The operation of the novel mechanism illustrated in FIG. 2 will be described in conjunction with the drawing of FIG. 3 which illustrates several different positions of the slidewire 40 and wiper 36. In FIG. 3, the slidewire 40 is schematically represented as having a lineal length $2d$ and being movable from a center position (FIG. 3a) to the left in the drawing (FIG. 3b) over a lineal distance $d/2$ to the limit 56. The limit 56 corresponds to a set point index 35 (position denoted by the arrow) of zero percent of its full scale value. It may be recalled that the point on the slidewire 40 that corresponds to the set point index 35 is the electrical center of the slidewire 40. In like manner in FIG. 3c the slidewire 40 is illustrated as being movable to the right from its center position over the lineal distance $d/2$ corresponding to the set point index 35 being positioned at 100% of its full scale value.

The wiper 34 is illustrated as having a range of movement to the left (FIG. 3c) or to the right (FIG. 3b) over a lineal distance $d/2$ to the respective limits 52 or 54 from a center position (FIG. 3a) that corresponds to the indicator pen 34 being at 50% of its full scale value. It is thus apparent that the range of wiper motion is $d$, the range of the slidewire motion is $d$, and the total length of the slidewire is $2d$. From this it may be noted that, regardless of the position of the slidewire 40 corresponding to set point index values between 0 and 100% full scale, the wiper 36 is always in contact with some portion of the slidewire 40. With this novel property, made possible by the mechanism of FIG. 2, the output signal derived from the comparator 37 (FIG. 1) is substantially continuously proportional to the amplitude of deviation between the set point index 35 and the indicator pen 34. Thus if the set point index 35 is at 0% of the full scale and the indicator pen 34 at 100% full scale, as illustrated in FIG. 3b, the wiper 36 contacts the extreme right end of the slidewire 40. Conversely, if the set point index 35 is at 100% full scale and the indicator pen 34 at 0% of full scale, as illustrated in FIG. 3c, the wiper 36 is at its left most limit 52 and contacts the extreme left end of the slidewire 40.

While the terms potentiometer, wiper and slidewire have been used in this illustrative description, it should be apparent that any electrical voltage or current divider element or other impedance element may be used. For example, tapped or variable inductance coils, variable capacitors, etc., may be employed as desired.

There has thus been described a relatively simple device for economically and accurately utilizing a low-torque potentiometer to detect the difference in amplitude between two mechanical input signals. The novel mechanism of this invention may provide an electrical output signal having an amplitude that is continuously proportional to the difference in amplitude between the mechanical input signals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A device for continuously comparing the instantaneous relative amplitudes of first and second mechanical input signals comprising, an impedance element having an independently variable tap; first means responsive to said first input signal for positioning said impedance element with respect to said tap, said first means having an upper limit of travel corresponding to the maximum amplitude of said first input signal of one-half the lineal length of said impedance element; second means responsive to said second input signal for positioning said tap with respect to said impedance element; said first means including adjustable coupling means for modifying the upper limit of travel of said tap corresponding to the maximum amplitude of said second input signal to be substantially the same as the upper limit of travel of said impedance element; and means coupled to said impedance element for electrically energizing said impedance element, thereby to develop an electrical output signal between said tap and a point on said impedance element that varies continuously as a function of the deviation between said first and second signal amplitudes.

2. A device for determining the deviation between the instantaneous amplitudes of first and second mechanical input signals having maximum amplitude variations of $w$ and $x$, respectively, comprising, an electrical impedance element having an independently adjustable tap and a lineal length $2y$; a source of said first signal, and a source of said second signal; a first linkage means coupled between said first signal source and said impedance element to position said impedance element with respect to said tap over a distance proportional to said first input signal amplitude up to a maximum distance $y$ for an amplitude variation $w$ of said first input signal; a second linkage means coupled between said second signal source and said tap to position said tap with respect to said impedance element over a distance proportional to said second input signal amplitude up to a maximum distance $y$ for an amplitude variation $x$ of said second input signal; said second linkage means being adjustable to allow said tap to move substantially only over the mid-portion of the range of movement of said impedance element; and means coupled to said impedance element for electrically energizing said impedance element, whereby to develop an electrical signal between said tap and one end of said impedance element which is a function of the instantaneous difference between said first and second mechanical input signals.

3. In an electrical controller for maintaining a process variable having a known range of variation at a predetermined set point, said controller including an electrical divider element operatively engaged with an independently adjustable tap, a proportioning motor, means coupled to said motor for varying the process variable, and means including an amplifier coupled to said divider for energizing said proportioning motor, the combination comprising, a sensor means responsive to said process variable for providing a mechanical output signal having an amplitude that is proportional to said process variable, adjustable reference means mechanically connected to said divider for varying the position of said divider element with respect to said tap, and varying means mechanically connected to said sensor and responsive to said mechanical output signal for varying the position of said tap only over a part of said divider element; said varying means including adjustable linkage means for adjusting the upper limit of the range of movement of said tap to be substantially the same as the upper limit of the range of movement of said divider element.

4. An electrical controller for maintaining the actual value of a process variable substantially at a selected value, said controller including transducing means for providing an output error signal that varies in amplitude and phase in accordance with the instantaneous difference between said selected and actual values of said process variable, and means including a servo system responsive to said output error signal for varying said process variable thereby to reduce said error signal to zero, said transducing means including sensing means responsive to said process variable for sensing its actual value, means responsive to said sensing means for providing a mechanical output signal whose amplitude varies as a function of the actual value of said process variable, an electrical divider element having a continuously variable tap, adjusting means mechanically connected to said divider element for positioning said divider element with respect to said tap, thereby to establish said selected value of said process variable, adjustable linkage means coupled to said sensing means and responsive to said mechanical output signal for varying the position of said tap only over a predetermined portion of the range of motion of said electrical divider element, whereby the amplitude and phase of said output error signal are substantially always proportional to said instantaneous difference between the actual and selected values of said process variable.

5. An electrical controller for maintaining the actual value of a process variable substantially at a selected value, said controller including transducing means for providing an output error signal that varies in amplitude and phase in accordance with the difference between said selected and actual values of said process variable, and means including a servo system responsive to said output error signal for varying said process variable, thereby to reduce said error signal to zero, said transducing means including sensing means responsive to said process variable for sensing its actual value, means responsive to said sensing means for providing a mechanical output signal whose amplitude varies as a function of the actual value of said process variable, an electrical divider element having a continuously variable tap, adjusting means mechanically connected to said divider element for positioning said divider element with respect to said tap in accordance with the selected value of said process variable, and adjustable linkage means coupled to said sensing means and responsive to said mechanical output signal for varying the position of said tap substantially only over the middle portion of the range of movement of said divider element, said adjusting means including means for limiting the range of movement of said divider element to one-half its lineal length, said adjustable linkage including means for adjusting the range of movement of said tap to be substantially identical to the range of movement of said divider element, whereby the amplitude and phase of said output error signal are substantially always proportional to said difference between the actual and selected values of said process variable.

References Cited by the Examiner

UNITED STATES PATENTS

| | | | |
|---|---|---|---|
| 2,208,762 | 7/40 | Hartig et al. | 318—28 |
| 2,273,760 | 2/42 | Nelson | 338—150 |
| 2,471,393 | 5/49 | Caldwell et al. | 338—150 |
| 2,518,332 | 8/50 | Keegon et al. | 338—150 |
| 2,636,151 | 4/53 | Hornfeck | 318—29 |
| 2,833,970 | 5/58 | Cummings et al. | 318—28 |

JOHN F. COUCH, *Primary Examiner.*

ORIS L. RADER, *Examiner.*